June 6, 1961    N. H. RUDOLPH    2,987,211
ELECTRICAL BOX COVER
Filed Dec. 12, 1958
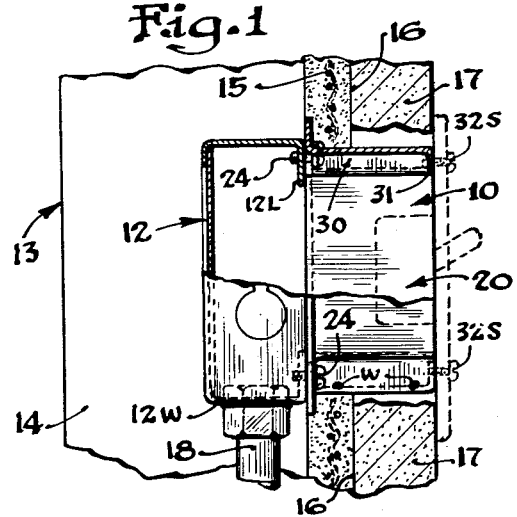
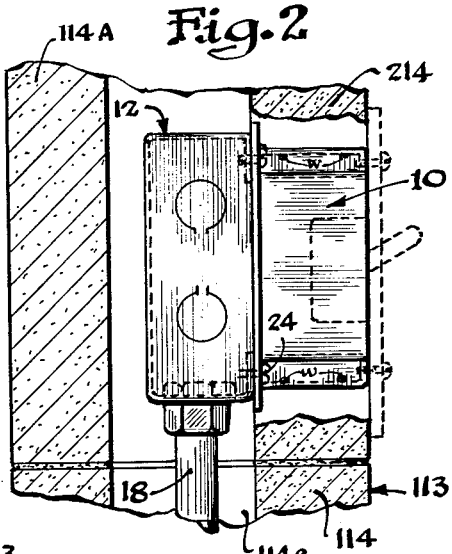
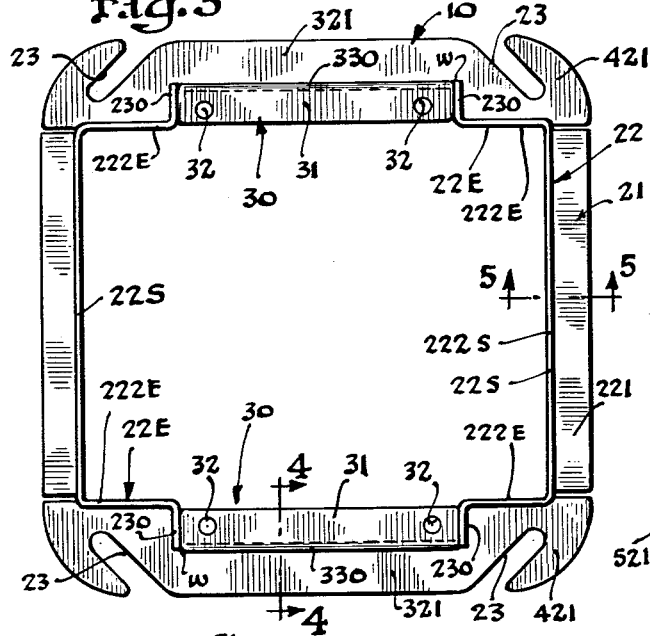
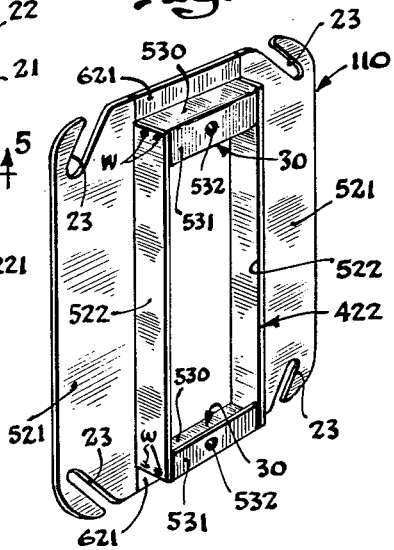
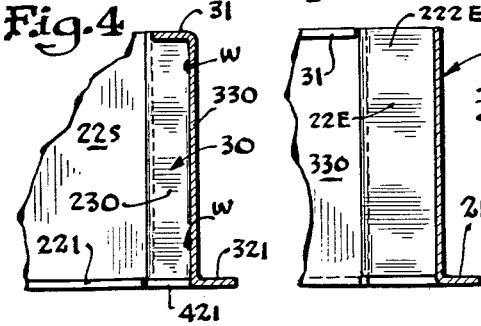
Inventor
Nathan H. Rudolph
By Mann, Brown & McWilliams
Attorneys

United States Patent Office 2,987,211
Patented June 6, 1961

---

2,987,211
ELECTRICAL BOX COVER
Nathan H. Rudolph, Aurora, Ill., assignor to All-Steel Equipment, Inc., a corporation of Illinois
Filed Dec. 12, 1958, Ser. No. 780,046
2 Claims. (Cl. 220—3.4)

This invention relates to electrical box covers and particularly to such covers that are adapted to be associated with conventional electrical boxes to form a forward extension that is often required to locate associated electrical devices such as switches or outlet plugs at substantially the inner face of the wall in which the box is mounted.

Electrical box covers of the aforesaid character are usually called tile covers, but as a matter of practice such tile covers are used in a wide variety of situations where, due to error or physical limitations, the electrical box is located too far inwardly or rearwardly within a wall structure so as to require means constituting a forward or outward extension of the box for the purpose of mounting and protecting the switches or connecting plugs that are to be mounted at the location defined by the electrical box. Thus, such tile covers are frequently used in brick or concrete block walls and are also used in situations where a dry wall facing such as plasterboard is to be applied to the main framework of a wall. As employed in connection with tile, such tile covers provide a forward or outward extension for an electrical box that is located at or slightly behind the face of the base surface upon which the tile is to be mounted, and the tile cover forms a metallic enclosure that is open-faced in character and which in a general sense defines the opening through the tile.

In work of this character, the original wall structure, whether it be a new wall or one that is being repaired, or re-faced, usually defines and limits the location of the electrical box insofar as the outer face of the finished wall may be concerned, and the electrical box is first put in position by the electrical workers and then the surfacing work on the wall is done by workmen such as carpenters, plasterers, masons, tile setters and the like. With the tile covers that have heretofore been used, it has been a common experience for the electrical workers to find, after completion of the work of other tradesmen, that they cannot conveniently accomplish the further electrical work and the switch or plug mounting operations that are required. Thus, the wires having been drawn through the associated conduit, or having been extended into the box from flexible cables, the electrical worker is called upon to install within the tile cover such electrical devices as may be specified for the particular electrical box. Such electrical devices may constitute a switch or a connector socket, and in either instance, the mounting thereof within the tile cover requires that fastening screws be extended in a rearward direction through the mounting bracket of the electrical device and into mounting openings that have been provided in the tile cover. The troubles that have thus been encountered have been caused primarily by other tradesmen extending the wall surfacing materials such as the tile or mortar into a position wherein the tile, mortar or the like, blocks the path of the fastening screws that must be employed.

In view of the foregoing it is the primary object of the present invention to provide a tile cover for electrical boxes which inherently prevents blocking of the fastening openings in the course of the installation of tile or other wall materials about the sides of the tile cover, and an object related to the foregoing is to provide such a tile cover that may be readily and easily installed in its position of use on the open and forward face of the electrical box.

Other and further objects of the present invention will be apparent from the following description and claims, and are illustrated in the accompanying drawings, which, by way of illustration, show preferred embodiments of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

FIG. 1 is a vertical sectional view illustrating an electrical installation in a lath and plaster wall where a tile cover embodying the invention is employed;

FIG. 2 is a vertical sectional view illustrating a tile cover of the present invention utilized in a hollow concrete tile wall;

FIG. 3 is a front view of one form of a tile cover embodying the features of the invention;

FIGS. 4 and 5 are fragmentary sectional views taken substantially along the lines 4—4 and 5—5 of FIG. 5; and FIG. 6 is a perspective view of another tile cover embodying the invention.

For purposes of disclosure the invention is herein illustrated in two different forms of tile cover; a tile cover 10 that is illustrated in FIG. 3, being adapted to receive two electrical devices of standard size, such as switches or outlet plugs, while a tile cover 110 is shown in FIG. 6 that is adapted to receive but a single electrical device, and both of these covers 10 and 110 being adapted for association with a square outlet box 12 of the kind that is identified as a 4 inch square box.

As shown in FIG. 1 of the drawings, the outlet box 12 is mounted in a wall 13 having wood studs 14 faced on the inner side of the studs by metal lath 15 and a plaster ground-coat 16 so that the inner face of the wall 13 may be thereafter faced with tile 17. The outlet box 12 has its position determined, at least in part, by the necessity for extension of the electrical conduit or cable through the wall for connection with the box 12, and as shown in FIG. 1, a conduit 18 connects to the lower side wall 12W of the box 12 and supports the box in such a position that its open forward face is located substantially in the plane of the back face of the plaster 16.

Before the plaster 16 has been put in place, the box 12 is prepared for the plastering and the mounting of the tile 17, and this is done by mounting a tile cover 10 or 110 of the present invention in position on the open forward face of the box 12 so that the tile cover forms a closed forward extension of the open face of the box and provides means at substantially the inner face of the tile 17 so that an electrical device such as a switch 20 may be fixed in position and in the proper relationship to the wall surface. Under the present invention, this forward extension of the open face of the box is provided in such a way that when the plaster and the tile 17 have been put in place, the tile cover 10 or 110 may be conveniently used to mount the electrical device or devices in position. Thus, in FIG. 1 of the drawings, the tile cover 10 has been illustrated, and the tile cover 10 is shown in detail in FIGS. 3 to 5 of the drawings. The tile cover 10 is herein shown as being of a welded construction which provides a bottom flange 21 extended entirely about the rear edge of a generally rectangular wall 22 that projects upwardly from the flange 21 in a generally symmetrical relationship. The flange 21 has a plurality of angularly positioned slots 23 formed therein near its respective corners for receiving fastening screws that may extend through these slots and may be threaded through inturned mounting lugs 12L that are conventionally provided near the corners of an outlet box. Thus the tile cover 10, as shown in FIG. 1, has a plurality of screws 24 extended through the slots 23 and threaded through the lugs 12L of the box 12, and when this is done, the wall 22 of the tile cover forms a substantial extension of the outlet box 12.

Under the present invention, the wall 22 is comprised of side walls 22S on opposite sides of the cover that extend forwardly from the flange 21 and terminate in narrow edges, while the other portions of the wall 22 constitute end walls 22E that connect the side walls 22S and which are formed with protecting pockets 30 therein, formed in part by extended portions of the side walls 22S, and having inwardly extended flanges 31 at their forward ends and substantially at the forward edges of the walls 22E. These flanges 31 have screw threaded mounting openings 32 formed therein, and as shown in FIG. 3, two sets of openings 32 are provided so that two electrical devices, such as a switch and an outlet plug, may be secured in place by passing screws 32S through the mounting bars of such electrical devices and through the threaded openings 32 of the respective sets. The overhanging flanges 31 and the walls of the pockets 30 serve to protect the space located rearwardly from the flanges 31 so that there is no danger that mortar or other material will be located rearwardly of the mounting openings 32, and because of this, the workmen may readily secure the electrical device in position without drilling or chipping operations that are often necessary to clear the mounting holes in conventional tile covers.

As above pointed out, the wall 22 of the tile cover may be formed with the pockets 30 through different structural arrangements, and as shown in FIGS. 3 to 5, the tile cover 10 is produced by welding of the parts, and the specific way in which the several parts are formed and related will therefore be described.

Thus, each side wall 22S and the related portion of the flange 21 are formed as a single stamping that comprises a wall section 222S with an outward flange 221 extended therefrom. At the opposite ends of the side walls 222S, the metal of the wall portion 222S is bent at right angles to form wall sections 222E that provide portions of the end walls 22E. At the ends of the wall portions 222E, flanges 230 are provided that extend parallel to the walls 222S and which are the proper size to form the end walls of the respective pockets 30.

As shown in FIGS. 3 and 4, the remaining portions of the pockets 30 are formed by wall sections 330 that have the flange 31 bent inwardly at their upper edges, and at their lower edges have outwardly directed flanges 321 that form those portions of the flange 21 that are directly opposite the pockets 30. In addition, however, the flange 321, in each instance, has endwise extensions 421 that in the assembled cover underlie the edges of the walls 230 and 222E, and these extensions 421 have the respective slots 23 formed therein. The parts of the tile cover, as thus described, are formed by cutting and stamping, and are secured together by welding the walls or flanges 230 to the ends of the wall 330 in each instance, thus to provide a rigid tile cover.

It will be noted that in the tile cover 10, the pockets 30 have a width that is less than the total width between the walls 22S, and hence the included angle outside of the wall 22 between the walls 222E and 230 provides a clearance space directly opposite the related slot 23 so that the workmen may readily and easily apply the required fastening screws through the slots 23 and into the lugs 12L of an electrical box 12.

As above pointed out, it is common practice to use tile covers in many different kinds of installations, and in FIG. 2 of the drawings, another illustrative kind of installation has been illustrated. Thus, a wall 113 has been shown being made of hollow concrete block 114 and a conduit 18 is shown as extending upwardly through a core 114C of the block to support electrical box 12 within an upward extension of the core 114C. The box 12 has a tile cover 10 associated therewith in a manner hereinabove described, and the masonry worker in building the wall 113 about the box 12 finds it necessary to either cut the particular concrete block that is to be put in position at the level of the box 12, or must use separately formed and relatively thin concrete block members for that portion of the work. As herein shown, the block 114A that is to be located at the level of the box 12 has its inner wall portion cut away, and the inner face of the wall 113 is then formed by a thin wall member 214 made of concrete which is cut into the proper sizes so that its parts may be fitted into position about the tile cover 10. In such an installation, the tile cover 10, of course, has a wall height substantially equal to the thickness of the member 214 so that the inner edge of the tile cover 10, as defined by the flanges 31 of the pocket 30, will be located substantially at the inner wall 13. In the laying of the masonry members about the tile cover 10, the pockets 30 serve to provide a protected space rearwardly of screw openings 32 so that the subsequent switch mounting operations may be readily and easily performed in the manner hereinbefore described.

In FIG. 6 of the drawings the tile cover 110 is shown in detail, and while this tile cover is adapted for association with a 4″ square electrical box, it has walls 422 that define a relatively narrow forward extension for an electrical box so that but a single electrical device such as a switch or an outlet plug may be mounted in position within the wall 422. As shown in FIG. 6, however, the cover has pockets 30 formed therein at the opposite ends of the wall structure 422 so that the fastening openings are effectually protected against blocking in the same general way as in the tile cover 10. The tile cover 110 as herein shown in also formed by welding sheet metal parts together. Thus, the cover 110 is formed from four sheet metal stampings. The side members of the tile cover 110 in each instance comprise relatively wide flange 521 having mounting slots 23 formed therein, and along its inner edge, each flange 521 has an upwardly bent wall 522 that terminates short of the opposite ends of the flange 521 and which is adapted to form the side portion of the wall 422. The other two stampings that form part of the tile cover 110 each comprises a flange 621 with a forwardly projecting wall 530 that forms one wall of the related pocket 30 and at the forward end of the wall 530 an inwardly projecting flange 531 is provided which will form the forward or protecting portion of the pocket 30. The flange 531 has mounting openings 532 formed therein. The four sets of parts are placed in the relationship shown in FIG. 6 and are secured together by welding the end portions of the flange 522 to the end edges of the walls 530.

The pockets 30 that are thus formed in the tile cover 110 serve to provide a protected space beneath or behind the fastening openings 532 so that after the tile or other wall facing has been put in place about the wall 422, an electrical device may be readily secured in position within the wall 422 by passing the fastening screws through the threaded openings 532.

From the foregoing description it will be apparent that the present invention provides an improved tile cover which, by reason of the provision of the protected pockets beneath the flanges that are to receive the electrical device, insures that these devices may be readily and easily put in place after completion of the wall facing operation.

Thus, while preferred embodiments of the invention have been illustrated herein, it is to be understood that changes and variations may be made by those skilled in the art without departing from the spirit and scope of the appending claims.

I claim:
1. A cover for an electrical box having side and end walls meeting at corners and defining generally a rectangular box-like structure open at the front and rear thereof, a base flange extended from the walls at the rear of said structure adapted to engage the forward edges of an electrical box, each of said end walls having first portions extending toward each other in a common plane from the related corners of the structure and having an outwardly spaced parallel central portion joined to said first portions by connecting walls to define a pocket extending substantially from the front to the rear of the end wall, said central portion of each end wall also including an inwardly directed portion extending over the front of said pocket and defining a front wall for the pocket, said front walls having openings therethrough for receiving securing means when a switch or the like is to be mounted in said box-like structure, and the base flange having screw receiving openings formed therein opposite said first portions of said end walls so that included angles between said connecting walls and said first portions of said end walls define clearance spaces for facilitating application of screws through the screw receiving openings of the base flange.

2. A cover for an electrical box comprising a pair of identical sheet metal side stampings and a pair of identical sheet metal end stampings with said side stampings each having a side wall with integral rear flanges along its entire rear edge extending in one direction at right angles to the side wall and said side wall at opposite ends thereof having end flanges extending at right angles therefrom and said end flanges having identical closure flanges extending respectively therefrom in opposite directions away from each other in a common plane, said end stampings each having an end wall of the same height as the aforesaid side walls and having a front flange along its front edge at right angles to the end wall and of a width substantially equal to the width of said closure flanges, each of said end stampings also having a rear flange extended from the rear edge of the end wall at right angles to the end wall and in the direction in which the related front flange extends, said rear flanges of said end stampings having extensions at the opposite ends thereof, said end stampings being disposed with the end walls thereof in spaced relation and with said front flanges in a common plane extending toward each other and said rear flanges in a common extending plane away from each other, and said side stampings being disposed in spaced relation with the side walls thereof parallel and their rear flanges extending away from each other in the plane of the rear flanges of the end stampings, said closure flanges engaging said end walls and being welded thereto to form a rigid assembly, said extensions of the rear flanges of the end stampings having screw-receiving openings therein, and said front flanges having threaded openings therein.

References Cited in the file of this patent

UNITED STATES PATENTS

| | | |
|---|---|---|
| 1,206,431 | Graybill | Nov. 28, 1916 |
| 1,839,250 | Newman et al. | Jan. 5, 1932 |
| 1,888,846 | Carlson | Nov. 22, 1932 |
| 1,938,309 | Williams | Dec. 5, 1933 |
| 2,212,505 | Abbott | Aug. 27, 1940 |
| 2,497,928 | Cafiero | Feb. 21, 1950 |
| 2,861,121 | Wolar | Nov. 18, 1958 |